UNITED STATES PATENT OFFICE.

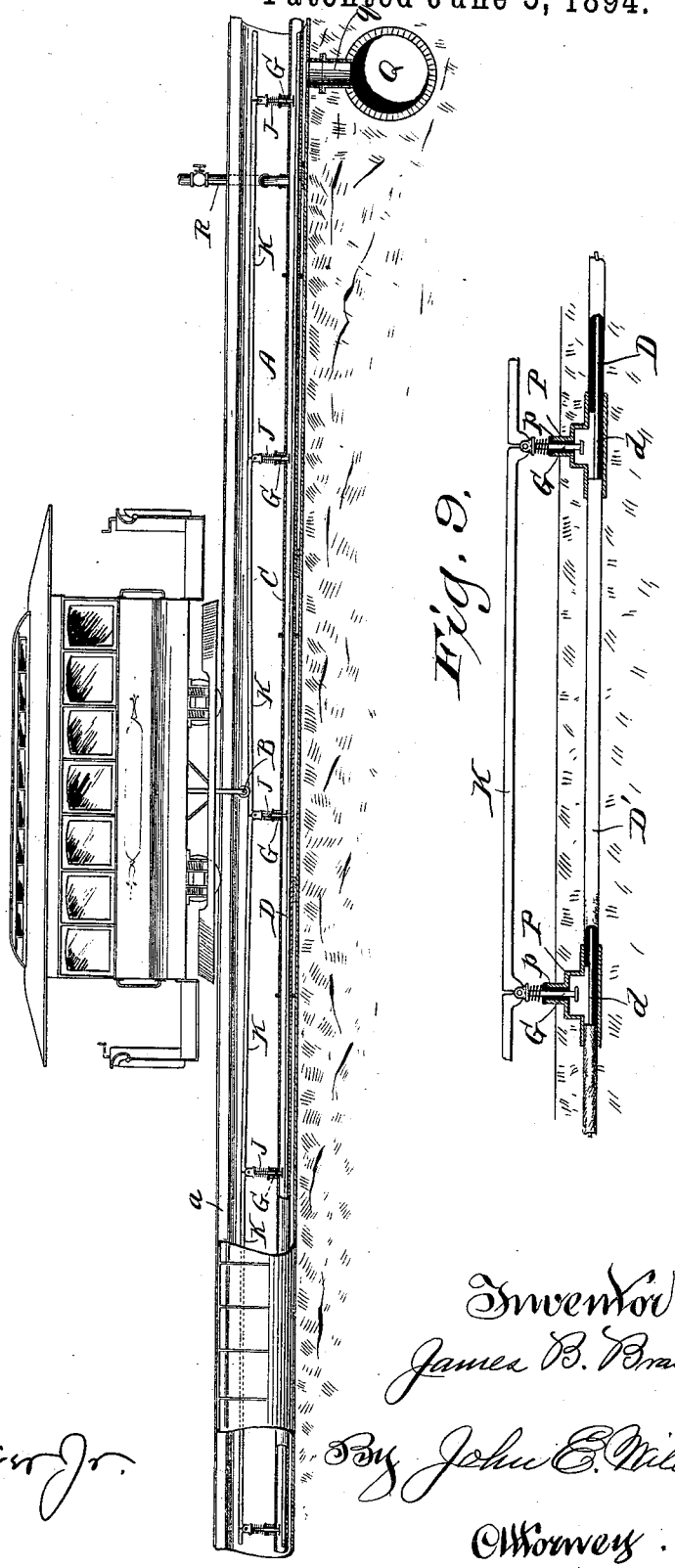

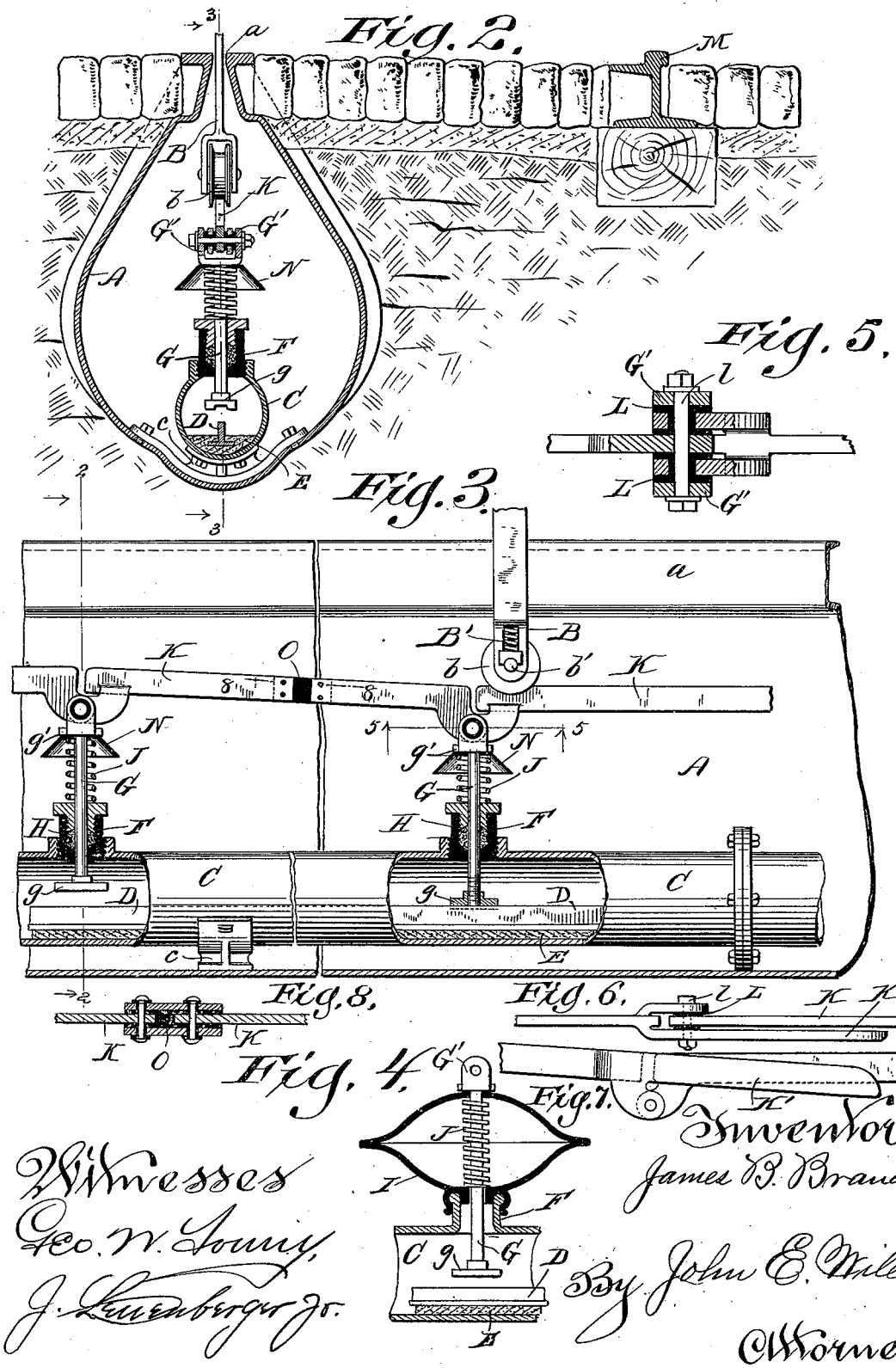

JAMES B. BRAND, OF MILWAUKEE, WISCONSIN.

CONDUIT ELECTRIC-RAILWAY SYSTEM.

SPECIFICATION forming part of Letters Patent No. 521,010, dated June 5, 1894.

Application filed March 19, 1894. Serial No. 504,220. (No model.) Patented in Canada April 24, 1894, No. 45,878.

*To all whom it may concern:*

Be it known that I, JAMES B. BRAND, a citizen of the United States, residing at Milwaukee, county of Milwaukee, State of Wisconsin, have invented a certain new and useful Improvement in Underground Conduits for Electric Railways; and I declare the following to be a full, clear, and exact description of the invention, such as will enable others skilled in the art to which it pertains to make and use the same, reference being had to the accompanying drawings, which form a part of this specification.

My invention relates to new and useful improvements in the construction of underground conduits for electric conductors, and consists in the matters hereinfter described and pointed out in the appended claims.

The subject-matter of this application, I have patented in Canada, said patent being numbered 45,878, and dated April 24, 1894.

In the construction of underground conduits, for electric conductors for electric railway lines, much difficulty has been heretofore experienced from the fact that by the ordinary forms of construction, the wires are unprotected from dampness which accumulates in the conduits and consequently short circuiting or grounding of the current is liable to frequently occur.

The object of my invention is to provide an underground conduit for electric railway conductors, of such construction that the conductors will be effectually protected from dampness, said conductors being wholly inclosed within an air-tight casing or covering, and provided with suitable means for making contact at intervals with said conductors, and for conveying current therefrom to the motor upon a car through the medium of movable service rails.

Referring to the accompanying drawings, Figure 1 is a longitudinal sectional view of a conduit constructed in accordance with my invention and shows a car located upon a track and provided with a contact device in operative engagement with the service rail. Fig. 2 is a transverse vertical sectional view of my improved conduit taken on line 2—2 of Fig. 3. Fig. 3 is a longitudinal sectional view of the same taken on line 3—3 of Fig. 2. Fig. 4 is a detail vertical sectional view of a somewhat different form of device for normally holding the service rail out of contact with the conductors. Fig. 5 is a horizontal sectional view on the line 5 5 of Fig. 3, illustrating the construction of the joint between adjacent sections of the service rail. Fig. 6 is a detail plan view of a somewhat different form of construction of joint. Fig. 7 is a side elevation of same. Fig. 8 is a detail, sectional view of a joint formed in the section of the service rail, said section being taken on the line 8—8 of Fig. 3. Fig. 9 is a longitudinal detail sectional view illustrating a somewhat different form of conduit.

In said drawings, A designates a suitable casing preferably of metal which is adapted to be located wholly beneath the surface of the ground, and is provided in its upper wall, with a suitable slot $a$, for the admission of a contact device B.

C designates a suitable tube or pipe, located in the lower part of the casing A, and supported in position therein, in any suitable manner as by means of the chair $c\,c$. A longitudinally extending conductor rail or wire D is located in the lower part of the tube or pipe C, but insulated therefrom, said conductor being conveniently partly embedded in a suitable insulating material E which is located in the lower part of the pipe or tube C.

At suitable intervals along the upper side of the pipe or tube C, I provide upwardly extending tubular connections F F, through which vertically movable plungers G G are arranged to extend, said plungers carrying at their lower ends suitable contact shoes $g\,g$ for electrical engagement with the upper or exposed portion of the conducting rail D. As shown more particularly in Figs. 2 and 3, these plungers G G may be arranged to extend vertically through suitable glands or stuffing boxes H H in the tubular extensions F F, or as shown in Fig. 4, said plungers may be arranged to extend downwardly through apertured elastic diaphragms I, which are secured in any desired manner to the upper ends of the tubular extensions F. Suitable springs J J are arranged around the upper portions of the plungers G G and are arranged to bear upwardly against suitable shoulders $g'$ $g'$ thereon, said springs being arranged to rest at their lower ends upon suitable supports on the tubular connections F F so as to normally hold the plungers G G upward with their contact shoes $g$ $g$ out of engagement with the conductor.

To the upper ends of the plungers G G are suitably secured sections K K of the service rail, said sections being pivotally engaged with the upper ends of said plungers and with each other in the manner shown in the drawings. As shown more particularly in Figs. 2, 3 and 5, the adjacent ends of the sections of the service rail are kept out of contact with each other by means of insulating washers L L, suitable bolts or rivets $l$ being passed through the end of the said sections and said washers and secured in any desired manner so as to flexibly connect the ends of the sections together. I find it convenient to make the upper ends of the plungers G G bifurcated as shown more particularly in Figs. 2 and 5, the furcations $G'$ $G'$ thereof being arranged to embrace the ends of the sections of the conducting service rail.

As shown more particularly in Figs. 2 and 5, I establish an electrical connection between each of the plungers G G and one end of the movable section of the service rail through the medium of the pivot pin or bolt $l$, which while it is insulated from one movable section, has metallic contact with the bifurcated upper end of the plunger, and the apertured end of one section of the service rail. It follows from this construction that by pressing downward upon any one section of the service rail, one of the plungers G G will be brought into electrical contact with the conductor D within the tube or pipe C at the bottom of the casing, and one section of the service rail will thereby be brought into electrical connection with said conductor.

In arranging the connections for the motor upon a car truck, said connections may be so made as to take current from the movable sections of the service rail through the motor, and to then pass the current to one of the track rails M in a familiar manner.

It will be seen that as the car advances, the contact device B is brought into engagement successively with the several sections of the service rail, the said sections being depressed and brought into connection with the conductor D, as the contact device advances and but one section K of the service rail being in circuit at one time.

In order to enable the contact device to operate satisfactorily in depressing the several sections of the service rail, and at the same time insure a perfect electrical contact with said section, I find it convenient to journal the roller $b$ in movable boxes $b'$ which are pressed downwardly by a spring $B'$ so as to forcibly hold the roller $b$ in engagement with the upper side of the service rail.

As soon as the contact device has passed from one section of the service rail into engagement with the next adjacent section thereof, the springs supporting the plungers connected with the first mentioned section will serve to automatically raise said plungers and said movable sections, so as to break the electrical contact between the plungers and the conductor.

If desired, I may employ means such as shown in Figs. 6 and 7 for permitting the contact device to come into engagement with the advance section of the service rail before passing the joints between the adjacent ends of the sections, and to this end I find it convenient to arrange at one side of the joint between said sections suitable extensions $K'$ which are arranged to extend somewhat beyond the point of engagement between two sections K K of the rail, and into position for engagement by the contact roller a little before the joint is reached. In this manner as the contact device approaches a joint in the service rail and depresses the adjacent ends of the two sections connected by said joint, the rear end of the section with which the contact device engages will be free to rise about the time that the contact device reaches the joint, and as soon as the electrical connection of the rear end of said section is broken, said section will of course be dead, while the next succeeding section will be in circuit, and it therefore follows that by the engagement of the contact device with the extension $K'$ of said next succeeding section, just before the joint is reached, the contact device will be enabled to take current from said succeeding section, and a constant flow of current through the motor is thereby insured.

This feature of my improvement is of especial importance upon grades, where an instant's break in the current might cause a stoppage of the car.

As shown more particularly in Fig. 2 of the drawings, I find it convenient to provide suitable means for protecting the movable parts from the accumulation of dirt which may find its way through the slot in the casing A and to this end I may provide suitable hoods N upon the upper ends of the plungers G G arranged to shed or deflect any dirt which may fall through the slot and prevent the same finding its way into or upon the stuffing boxes through which the plunger is passed, thereby guarding against undue wear on the stuffing boxes or the moving parts.

In the particular device shown in Fig. 4 however, no such precaution will be necessary inasmuch as the upper part of the plunger is inclosed within the elastic diaphragm I, and all dirt is effectually excluded therefrom.

If desired, I might employ between adjacent sections of the service rail, suitable insulated joints such as shown in Figs. 3 and 8 at O, the connected ends of the sections being electrically insulated from each other in a familiar manner. By this means, the adjacent ends of the sections which are pivotally secured together might receive current from one plunger at the same time, the insulation in the joint between said sections being of course omitted.

In the form of construction shown in Fig. 9, I have illustrated the conductor D as inclosed in a suitable insulating cover D' throughout the greater part of its length, but being bared at intervals as at $d$ $d$ and arranged to extend horizontally through suitable hollow casings P P within which the plungers G G are arranged to operate in the manner before described. In this form of construction, the entire housings P P as well as the insulated conductors, may be buried in a suitable cement or other material at the bottom of the casing A, it being only necessary to arrange the housings so as to permit the tubular extensions $p$ $p$ thereof to extend upward through said cement or other material so as to enable the plungers G G to engage therewith.

By my improved construction I am enabled to effectually protect the conductor against dampness and to thereby guard against accidental short circuiting or grounding of the current and consequent derangement of the system.

As a further and separate improvement I prefer to connect the main casing A at suitable intervals with a sewer Q by means of suitable tubular connections $q$, so as to enable any accumulation of water within the casing to find its way out of the casing into the sewer.

As a still further and separate improvement, I prefer to provide a suitable blast pipe R at any convenient point or points along the line of the conduit, and arranged to communicate with the interior of the tube or pipe C whereby a blast of hot or dry air may be forced through said pipe or tube to drive out any moisture that might find its way into the same, on account of a leak in the pipe or tube.

Having thus described my invention, what I claim as new, and desire to secure by Letters Patent of the United States, is—

1. An underground conduit for electric conductors, comprising a closed tube or pipe, a conductor extending longitudinally therethrough, but insulated therefrom, a plurality of contact devices movably engaged within bearings in the side wall of said tube or pipe and adapted for electrical contact with said conductor, means for normally holding said contact devices out of contact with said conductor, and a service rail comprising a plurality of sections flexibly engaged with and insulated from each other at the joint and pivotally connected at the joint with said contact devices, substantially as described.

2. An underground conduit for electric conductors comprising a closed tube or pipe, a conductor extending longitudinally therethrough, but insulated therefrom, a plurality of tubular extensions in the upper side of said tube or pipe, contact devices movably engaged within said extensions, and adapted for electrical contact with said conductor means for normally holding said contact devices out of contact, and a service rail comprising a plurality of sections having overlapping ends pivotally connected and insulated from each other and a flexible connection between said ends and said contact devices, and said sections adapted for successive engagement with a contact device carried by a car, substantially as described.

3. An underground conduit for electric conductors comprising a closed tube or pipe, a conductor extending longitudinally therethrough, but insulated therefrom, tubular connections located at intervals in the upper side of said pipe, plungers vertically movable therein and adapted for engagement at their inner ends with said conductor, springs for normally holding said conductors out of contact with the conductor, shields for protecting said plungers and their bearings from dirt and dust, and a service rail comprising a plurality of sections flexibly engaged at their adjacent ends with each other and with said plungers, but insulated from each other and adapted to be depressed by engagement with a contact device carried by a car, substantially as described.

4. The combination in an underground conduit with the closed tube and its contained conductor, of vertically movable plungers extending to the inside of the tube and adapted for electrical contact with said conductor, and a service rail comprising a plurality of sections insulated from each other and flexibly engaged at their adjacent ends with said plungers and each of said sections being provided with an extension adjacent to its pivotal connection with the next adjacent section and arranged to project past said connection, and adapted for engagement by an advancing contact device, before said device reaches said connection, substantially as described.

5. An underground conduit for electric conductors comprising a main casing provided in its upper side with a longitudinal slot, a closed tube or pipe located within said casing, and provided in its upper side with a plurality of tubular extensions, a conductor extending longitudinally through said pipe but insulated therefrom, vertically movable plungers engaged with air and water tight bearings in said tubular extension, and carrying at their lower ends suitable contact shoes for electrical engagement with said conductor, springs for normally holding said plungers out of contact and a contact or service rail comprising a plurality of sections pivotally secured at their adjacent ends to said plungers but insulated from each other, and adapted for engagement by an advancing contact device carried by a car, and to be successively depressed thereby so as to bring the plungers successively into electrical contact with said conductor, substantially as described.

In testimony whereof I sign this specification in the presence of two witnesses.

JAMES B. BRAND.

Witnesses:
JOHN E. WILES,
J. LENENBERGER, Jr.